United States Patent
Carbone et al.

(10) Patent No.: US 11,153,273 B2
(45) Date of Patent: Oct. 19, 2021

(54) GENERATING AND MANAGING NAMES OF INSTANCES

(71) Applicant: International Business Machines Corporation, Armonk, NY (US)

(72) Inventors: Nicholas Carbone, Poughkeepsie, NY (US); John L. Czukkermann, LaGrangeville, NY (US); Michael D. Essenmacher, Danbury, CT (US); Kirsten B. McDonald, Poughkeepsie, NY (US); Gary S. Puchkoff, Poughkeepsie, NY (US); Donald W. Schmidt, Stone Ridge, NY (US); Hiren R. Shah, Highland, NY (US); Brad D. Stilwell, Poughkeepsie, NY (US); Andrew P. Wack, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 806 days.

(21) Appl. No.: 15/377,410

(22) Filed: Dec. 13, 2016

(65) Prior Publication Data

US 2018/0167358 A1    Jun. 14, 2018

(51) Int. Cl.
*H04L 29/12* (2006.01)
*H04L 29/08* (2006.01)
*H04L 12/24* (2006.01)

(52) U.S. Cl.
CPC ........ *H04L 61/305* (2013.01); *H04L 61/3065* (2013.01); *H04L 41/00* (2013.01); *H04L 67/1002* (2013.01)

(58) Field of Classification Search
CPC ... H04L 67/1002; H04L 41/00; H04L 61/305; H04L 61/3065
See application file for complete search history.

(56) References Cited

U.S. PATENT DOCUMENTS

| | | | |
|---|---|---|---|
| 5,446,903 A | 8/1995 | Abraham et al. | |
| 5,790,789 A | 8/1998 | Suarez | |
| 6,826,744 B1 * | 11/2004 | McAuley | G06F 8/20 717/108 |
| 6,854,016 B1 | 2/2005 | Kraenzel et al. | |
| 6,880,129 B1 | 4/2005 | Lee et al. | |
| 7,054,924 B1 | 5/2006 | Harvey et al. | |

(Continued)

OTHER PUBLICATIONS

Buzzetti et al., "Determining Identities for Executing Cloud Processing and Approvers of the Executing," U.S. Appl. No. 15/377,354, filed Dec. 13, 2016.

(Continued)

*Primary Examiner* — Uzma Alam
(74) *Attorney, Agent, or Firm* — Cantor Colburn LLP; Teddi Maranzano

(57) ABSTRACT

A method includes provisioning, by a cloud provisioning server, a first instance based on a template. The template belongs to a tenant, and the first instance includes one of an instantiated software and an instantiated computing service. The method also includes determining a prefix. The determined prefix is shared by a second instance that is also provisioned based on the template of the tenant. The method also includes generating a name for the first provisioned instance. The generated name includes the determined prefix.

17 Claims, 8 Drawing Sheets

(56) References Cited

U.S. PATENT DOCUMENTS

| | | | |
|---|---|---|---|
| 7,200,805 B2 | 4/2007 | Carlson et al. | |
| 7,603,443 B2 | 10/2009 | Fong et al. | |
| 7,673,328 B1* | 3/2010 | Kojima | H04L 63/083 380/248 |
| 8,010,899 B2 | 8/2011 | Choi | |
| 8,122,063 B2 | 2/2012 | Kraft et al. | |
| 8,200,715 B1 | 6/2012 | Kraft et al. | |
| 8,266,616 B1 | 9/2012 | Jacquot et al. | |
| 8,677,318 B2 | 3/2014 | Mohindra et al. | |
| 8,706,776 B1 | 4/2014 | Kraft et al. | |
| 8,874,755 B1 | 10/2014 | Deklich et al. | |
| 9,069,979 B2 | 6/2015 | Srinivasan et al. | |
| 9,276,942 B2 | 3/2016 | Srinivasan et al. | |
| 9,330,161 B2 | 5/2016 | D'Amato et al. | |
| 10,146,590 B1* | 12/2018 | Golla | G06F 9/5072 |
| 2004/0083453 A1 | 4/2004 | Knight et al. | |
| 2005/0149907 A1* | 7/2005 | Seitz | G06F 9/5016 717/108 |
| 2005/0271050 A1 | 12/2005 | Akgun | |
| 2007/0157317 A1 | 7/2007 | Venkatachalam et al. | |
| 2008/0189206 A1 | 8/2008 | Choi | |
| 2008/0301672 A1 | 12/2008 | Rao et al. | |
| 2010/0125612 A1 | 5/2010 | Amradkar et al. | |
| 2011/0320605 A1 | 12/2011 | Kramer | |
| 2013/0091547 A1 | 4/2013 | Venkatesh et al. | |
| 2013/0185431 A1* | 7/2013 | Venkatesh | G06F 9/5072 709/226 |
| 2014/0033200 A1* | 1/2014 | Tompkins | G06F 9/45558 718/1 |
| 2014/0047319 A1 | 2/2014 | Eberlein | |
| 2014/0074973 A1 | 3/2014 | Kumar et al. | |
| 2014/0075021 A1* | 3/2014 | Revanuru | H04L 43/04 709/224 |
| 2014/0075565 A1 | 3/2014 | Srinivasan | |
| 2015/0156218 A1 | 6/2015 | Arun et al. | |
| 2015/0278397 A1 | 10/2015 | Hendrickson et al. | |
| 2016/0094483 A1 | 3/2016 | Johnston et al. | |
| 2016/0105393 A1 | 4/2016 | Thakkar et al. | |
| 2016/0132805 A1 | 5/2016 | Delacourt et al. | |
| 2016/0132808 A1 | 5/2016 | To et al. | |
| 2016/0182525 A1 | 6/2016 | Zhu et al. | |
| 2016/0191411 A1 | 6/2016 | Kim et al. | |
| 2016/0212012 A1* | 7/2016 | Young | H04L 41/14 |
| 2016/0323183 A1* | 11/2016 | Jeuk | H04L 41/5058 |
| 2016/0330288 A1 | 11/2016 | Hoffman et al. | |
| 2017/0070500 A1 | 3/2017 | Hockey et al. | |
| 2017/0140405 A1 | 5/2017 | Gottemukkala et al. | |
| 2017/0169339 A1 | 6/2017 | Dalmia et al. | |
| 2017/0171146 A1 | 6/2017 | Sharma | |
| 2017/0180346 A1 | 6/2017 | Suarez et al. | |
| 2017/0220448 A1 | 8/2017 | Topiwala et al. | |
| 2017/0364345 A1 | 12/2017 | Fontoura et al. | |
| 2018/0032399 A1 | 2/2018 | Johnson et al. | |
| 2018/0039494 A1* | 2/2018 | Lander | H04L 63/0815 |
| 2018/0129665 A1* | 5/2018 | Bach | G06F 16/113 |
| 2018/0137139 A1 | 5/2018 | Bangalore et al. | |
| 2018/0150377 A1 | 5/2018 | Oberle | |
| 2019/0065575 A1 | 2/2019 | Dixon et al. | |

OTHER PUBLICATIONS

Carbone et al., "Configuring and Naming of Cloud Provisioning Entities," U.S. Appl. No. 15/377,427, filed Dec. 13, 2016.

Carbone et al., "Performing Actions That Have Been Defined for Provisioned Instances," U.S. Appl. No. 15/377,398, filed Dec. 13, 2016.

List of IBM Patents or Patent Applications Treated as Related; Date Filed: Dec. 13, 2016, 2 pages.

Bertino et al. "Securing XML documents with Author-X." IEEE Internet Computing, vol. 5, Issue 3, May 2001, p. 21-31.

Gao, "Study on the Expended-Enterprise Information Portal Based on the Role Control Theory", Applied Mechanics and Materials, vols. 40-41, pp. 631-636, 2011. (Abstract only).

* cited by examiner

Resources ▶ Create Tenant ▶ Add Template and Resource Pool

Add Template and Resource Pool

Select a template name, then supply values that will be used to create a resource pool for the template. If required template is not in the list, go to the Software Services task to add a template.

* Select Template

Template2

* Resource pool name

Pool2

* Software service instance name prefix: ⓘ — 110

TEMP2*

* Number of software service instances limit: ⓘ

200

Number of software service instances per user or group. ⓘ

| Action | Prefix | Generated Name |
|---|---|---|
| First instance provisioned from template A in tenant TA. | DB2A | DB2A00 |
| Second instance provisioned from Template A in tenant TA. | DB2A | DB2A01 |
| First instance provisioned from template B in tenant BA. | CICST* | CICST000 |
| Second instance provisioned from Template B in tenant BA. | CICST* | CICST001 |
| Additional name requested in provisioned instance named CICST001. | CICST* | CICST101 |
| Additional name requested in provisioned instance named CICST001. | CICST* | CICST201 |
| Additional name requested in provisioned instance named CICST000. | CICST* | CICST100 |

FIG. 2

| Actions ▾ | | | | |
|---|---|---|---|---|
| → No filter applied | | | | Find |
| ☐ Tenant Name / Template<br>Filter | Groups<br>Filter | User IDs<br>Filter | Instances Limit<br>Filter | Instances Actual<br>Filter |
| ☐ ⊞ NewTenant | | zosmfad | | |
| ☐ Template2 | | | 200 | 2 |
| ☐ Template3 | | | 50 | 1 |

GENERATING AND MANAGING NAMES OF INSTANCES

BACKGROUND

Embodiments relate in general to generating and managing names of instances. More specifically, embodiments relate to automatically generating and managing names of provisioned instances.

"Provisioning" generally relates to configuring, managing, and providing of computing software resources and/or computing services. In the context of a cloud provisioning environment, a cloud provider can configure, provide, and manage computing software resources and/or services that are allocated to a user. Software resources and services are provisioned to users by providing the users with instantiations ("instances") of the software resources and services.

SUMMARY

According to one or more embodiments, a method can include provisioning, by a cloud provisioning server, a first instance based on a template. The template belongs to a tenant. The first instance includes one of an instantiated software and an instantiated computing service. The method also includes determining a prefix. The determined prefix is shared by a second instance that is also provisioned based on the template of the tenant. The method also includes generating a name for the provisioned instance. The generated name includes the determined prefix.

According to one or more embodiments, a computer system can include a memory. The computer system also includes a processor system communicatively coupled to the memory. The processor system is configured to perform a method including provisioning a first instance based on a template. The template belongs to a tenant, and the first instance includes one of an instantiated software and an instantiated computing service. The method can also include determining a prefix. The determined prefix is a prefix that is shared by a second instance that is also provisioned based on the template of the tenant. The method can also include generating a name for the first provisioned instance. The generated name includes the determined prefix.

According to one or more embodiments, a computer program product is provided. The computer program product can include a computer-readable storage medium. The computer-readable storage medium has program instructions embodied therewith. The computer-readable storage medium is not a transitory signal per se, the program instructions readable by a processor system to cause the processor system to perform a method. The method includes provisioning, by a cloud provisioning server, a first instance based on a template. The template belongs to a tenant, and the first instance includes one of an instantiated software and an instantiated computing service. The method can also include determining a prefix. The determined prefix is shared by a second instance that is also provisioned based on the template of the tenant. The method can also include generating a name for the first provisioned instance. The generated name includes the determined prefix.

BRIEF DESCRIPTION OF THE DRAWINGS

The subject matter of one or more embodiments are particularly pointed out and distinctly defined in the claims at the conclusion of the specification. The foregoing and other features and advantages are apparent from the following detailed description taken in conjunction with the accompanying drawings in which:

FIG. 1 depicts an interface that adds a template to a tenant, in accordance with one or more embodiments;

FIG. 2 illustrates different example provisioned instances, and the example names of the different provisioned instances, in accordance with one or more embodiments;

FIG. 3 depicts an interface that displays information of an example tenant, along with templates that have been added to the example tenant, in accordance with one or more embodiments;

DETAILED DESCRIPTION

Figure 4:
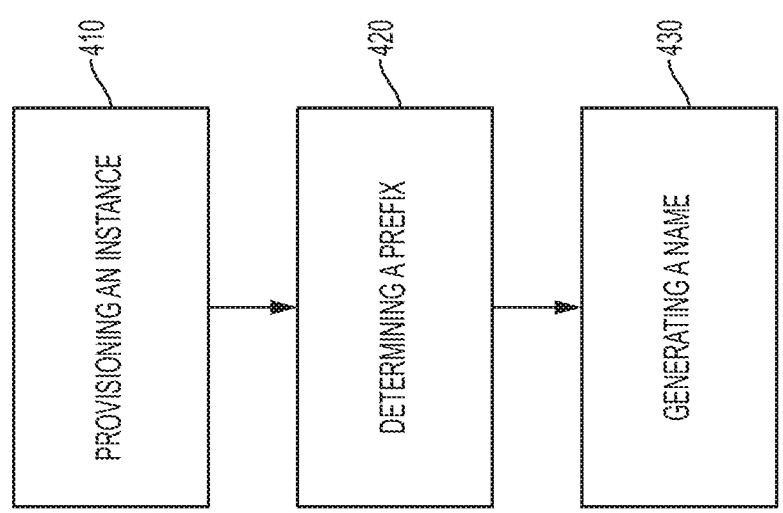
FIG. 4 depicts a flowchart of a method in accordance with one or more embodiments.

One or more embodiments include methods and computer program products for generating and managing names of provisioned instances. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

It is also understood in advance that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

As discussed above, "provisioning" generally relates to configuring, managing, and providing of computing software and/or computing services. One example of provisioning software is the provisioning of a software instance. A software instance can be a specific realization of a software application when the application is run.

Embodiments are directed to automatically generating (and managing) of names for provisioned instances. The previous approaches of using and installing software did not perform software provisioning, and the previous approaches did not perform automatic naming of installed software. Rather, with the previous approaches, a system administrator would typically manually install each piece of software and decide upon the name of each piece of installed software. Thus, with the previous approaches, the system administrator would bear the responsibility of naming each piece of installed software, and the system administrator would have the responsibility of managing each name. For example, the system administrator would have the responsibility of preventing redundancies in naming. Further, if any associations between installed software exist, it is generally desirable to name the software so that a user can ascertain the existing associations between the named software, as described in more detail below. With the previous approaches, the system administrator would also have the responsibility of naming the software so that the existing associations can be ascertained. In view of the above, embodiments are directed to automatically determining names for provisioned instances, where the names reflect associations between the provisioned instances.

Embodiments can perform software provisioning in a cloud-computing environment, where the cloud-computing environment can include multiple domains. A domain is generally considered to be a container (such a group of persisted memory, for example) that groups templates, resources, and/or deployed instances. The templates, resources, and deployed instances of a domain can share one or more characteristics. The shared characteristic between the templates, resources, and/or instances can be that they correspond to the same corporate department (i.e., an accounting department and/or an application development department), and/or the same set of served customers, for example.

Each domain can also be associated with one or more tenants. A tenant is generally considered to be a container that includes templates and resource pools. If instances are provisioned from the same template of the same tenant, for example, embodiments can use a shared/common name space to name these provisioned instances. Using a shared/common name space generally means using names from a set of names, where each name of the set of names includes some shared characteristic. By using a shared/common name space to name instances, the named instances can be more easily correlated to each other. In other words, the association between named instances (of being provisioned from the same template of the same tenant, for example) can be reflected in the naming of the instances, and thus the instances can be correlated with each other. In other words, the naming can allow a user to ascertain an association between the instances.

The shared/common name space of embodiments can include a prefix that is derived from a resource pool. As described above, the shared/common name space can be used to name instances that are provisioned from the same template of the same tenant, for example. The resource pool (from which the prefix can be derived) can be a pool of computing resources that has been assigned to the template that the instances are provisioned from.

In exemplary embodiments, the prefix that is derived from the resource pool can correspond to a prefix that has been previously assigned to the resource pool, for example. Each time that a resource pool is first configured by a system administrator, the system administrator can assign a prefix to the created resource pool. The prefix that is assigned to the created resource pool can be the prefix that is used by the name space.

As referenced above, in order to provision an instance that is based on a template, the template may need to be first associated with a tenant and a resource pool. When the template and the resource pool are associated with a tenant of a domain, an administrator can specify additional attributes that can be used in the naming of instances.

Attributes for the naming of the instances can include some or all of the following. In addition to including a prefix, as described above, the name of the software/service instance can also include a number that reflects the number of existing instances. For example, if a third instance is newly provisioned based on a same template/tenant as the previous two instances, then the name of the third instance can include a "3," to reflect a number of existing instances. The administrator can also specify a limit on the number of software service instances that can be instantiated. For example, an administrator can specify that the number of software service instances is to be limited to 200. As such, the numbering of the names can be limited to "200," for example. The administrator can also designate the number of software service instances that can be instantiated per a user or per a group. The numbering of the names can also be based upon such attributes that are specified by the administrator.

FIG. 1 depicts an interface 100 that adds a template to a tenant, in accordance with exemplary embodiments. Referring to interface 100 of FIG. 1, a template "Template2" is added to a tenant. As described above, in order to provision an instance based on "Template2," the template needs to be associated with a resource pool. Referring to interface 100, "Template2" is associated with resource pool "Pool2." Further, a user can designate a prefix for the template in input box 110. In certain embodiments, the user can input a prefix for the template. Other embodiments can automatically generate a prefix for the template. In this example, the user has designated a "TEMP2*" prefix. As described above, the prefix of an instance name can be derived from an associated resource pool. Further, the administrator/user has designated a limit of software instances to be "200," and has designated a number of software instances per user or group to be "2."

As discussed above, the name of a software/service instance can include a prefix. The prefix that is used for the software/service instance name can be the prefix that is assigned to the template of the instance. In addition to the parameters described above, exemplary embodiments can implement some or all of the following rules for determining the prefix. As one example rule, a prefix can have a length of 1 to 6 characters, for example. A prefix can include alphanumeric uppercase characters, for example. The last character of a prefix can also include a wildcard character, such as a "*", for example.

In addition to the above-described parameters for determining a prefix of an instance, one or more embodiments can also implement the following rules for determining the name of a provisioned instance. For example, names can be generated with a length of 3 to 8 characters, dependent on the prefix length and depending on whether a wildcard character was included in the prefix. The first characters of the name can correspond to the prefix, not including any wildcard character that is included in the prefix. With one or more embodiments, if a wildcard character was included in the prefix, a "0" can be appended to the end of the prefix within the name, instead of appending the wildcard character.

Next, two additional digits can be appended to generate the name of the instance. These two additional digits can be in an uppercase alphanumeric format, ranging from 00 to ZZ, and these digits can reflect the number of existing instances that have been provisioned from a same tenant/template, as described above.

As described above, if a wildcard character was included in the prefix, a "0" can be appended to the end of the prefix within the name. With one or more embodiments, if a wildcard character was included in the prefix, then additional names based on the name of the software/service instance can be obtained, in which case the "0" that was appended to the prefix can be replaced with a unique digit to generate the additional names. For example, additional names can be obtained via services provided, for example, in a provisioning server. One example of such a service is a REST API service called "createNames."

FIG. 2 illustrates different examples of provisioned instances, and the example names of the different provisioned instances, in accordance with one or more embodiments. Referring to FIG. 2, a first provisioned instance 210 is provisioned from template A in tenant TA. A second provisioned instance 220 is also provisioned from template A in tenant TA. Because the first provisioned instance 210 and the second provisioned instance 220 are provisioned from the same template A of the same tenant TA, both of these provisioned instances share a prefix "DB2A." The entire generated name of first provisioned instance 210 is "DB2A00," and the entire generated name of second provisioned instance 220 is "DB2A01." Therefore, by sharing the prefix "DB2A," the association between first provisioned 210 and second provisioned instance 220 can be ascertained. The use of a shared/common prefix to generate the names for all software/service instances (that are provisioned from the same template of the same tenant, for example) allows the instances to be easily correlated. As such, the software/service instances can be recognized as peers of each other.

In a provisioning server environment, software services can provide benefits based on a recognized correlation between software/service instances. For example, by recognizing correlations between software/service instances, names of start procedure jobnames can more readily determined, and workload management policy definitions can be more readily determined. One or more embodiments can provide a view of a name space use in template tenants.

FIG. 3 depicts an interface 300 that displays information of an example tenant, along with templates that have been added to the example tenant, in accordance with one or more embodiments. Referring to the example of FIG. 3, the example tenant "NewTenant" has two templates "Template2" and "Template3." "Template2" has an instance limit of 200, and "Template3" has an instance limit of 50.

FIG. 4 depicts a flowchart of a method in accordance with one or more embodiments. The method includes, at block 410, provisioning, by a cloud provisioning server, a first instance based on a template. The template belongs to a tenant, and the first instance includes one of an instantiated software and an instantiated computing service. The method can also include, at block 420, determining a prefix. The determined prefix is shared by a second instance that is also provisioned based on the template of the tenant. The method can also include, at block 430, generating a name for the first provisioned instance. The generated name includes the determined prefix.

Figure 5:
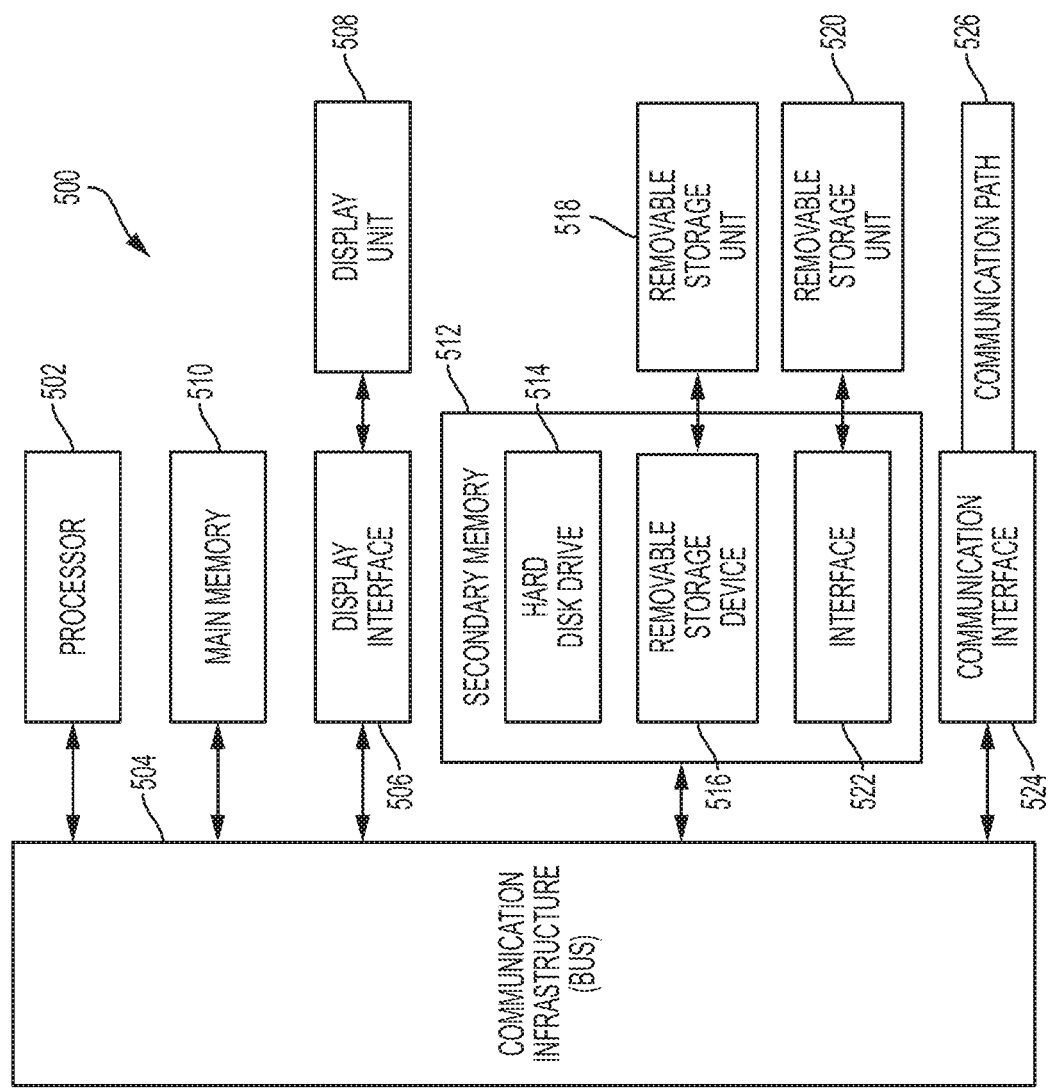
FIG. 5 depicts a high-level block diagram of a computer system, which can be used to implement one or more embodiments.

FIG. 5 depicts a high-level block diagram of a computer system 500, which can be used to implement one or more embodiments. More specifically, computer system 500 can be used to implement hardware components of systems capable of performing methods described herein. For example, computer system 500 can be used to implement the hardware components of a provisioning server and/or a naming server. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
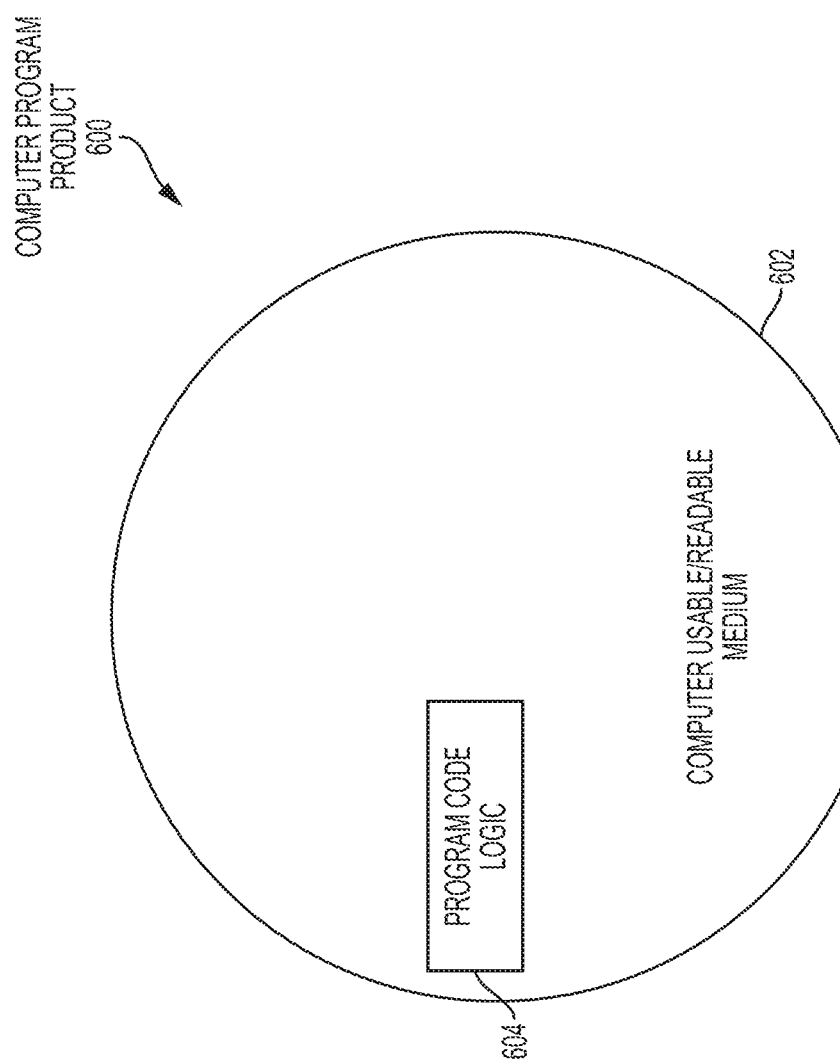
FIG. 6 depicts a computer program product, in accordance with an embodiment.

Referring now to FIG. 6, a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
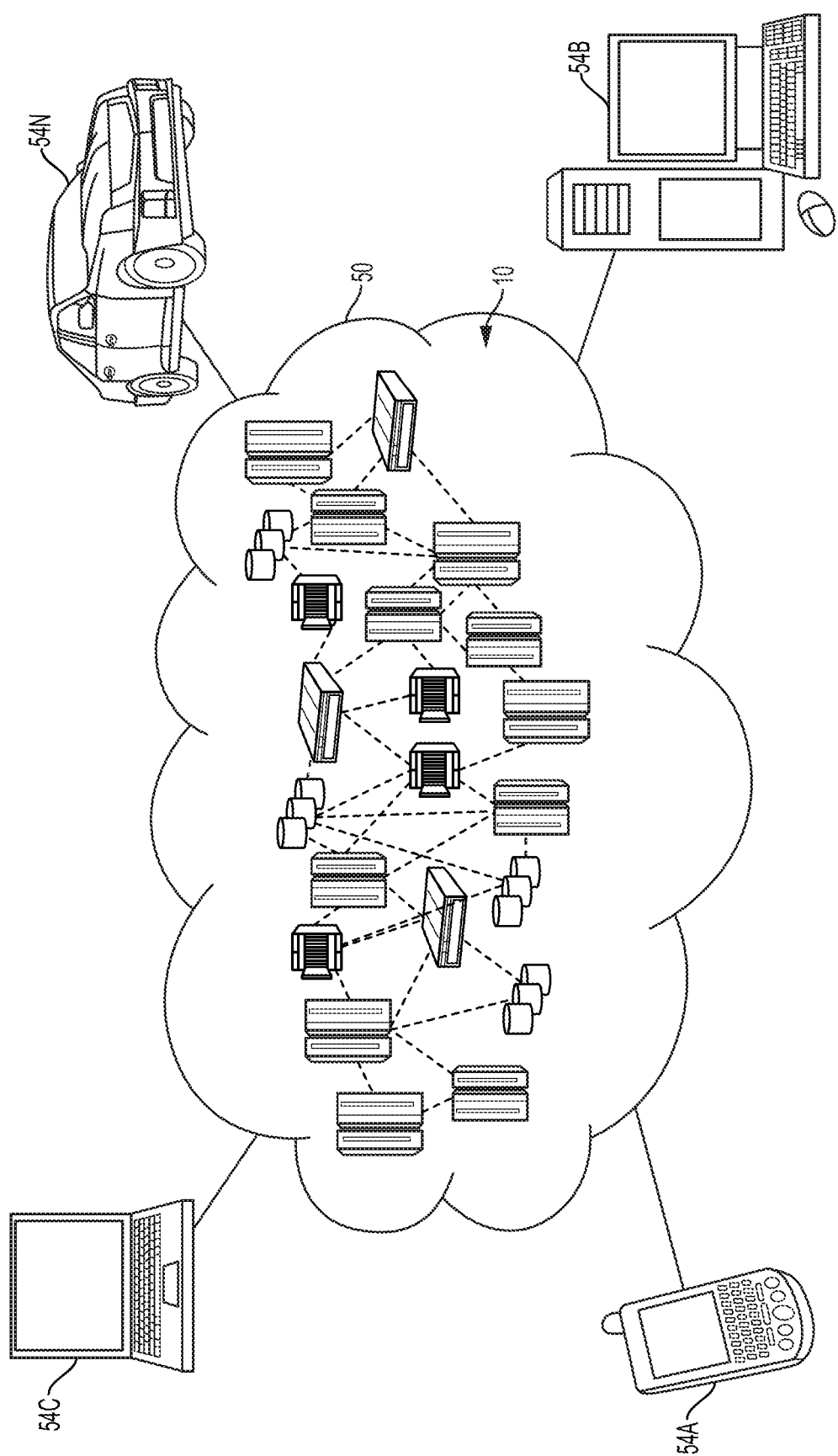
FIG. 7 depicts a cloud computing environment according to an embodiment.

FIG. 7 depicts a cloud computing environment according to an embodiment. Referring FIG. 7, illustrative cloud computing environment 50 is depicted. As described above, one or more embodiments can be implemented within a cloud computing environment. A system (such as a provisioning server and/or a naming server, for example) that performs the method of FIG. 4 can also be implemented within a cloud computing environment, for example. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
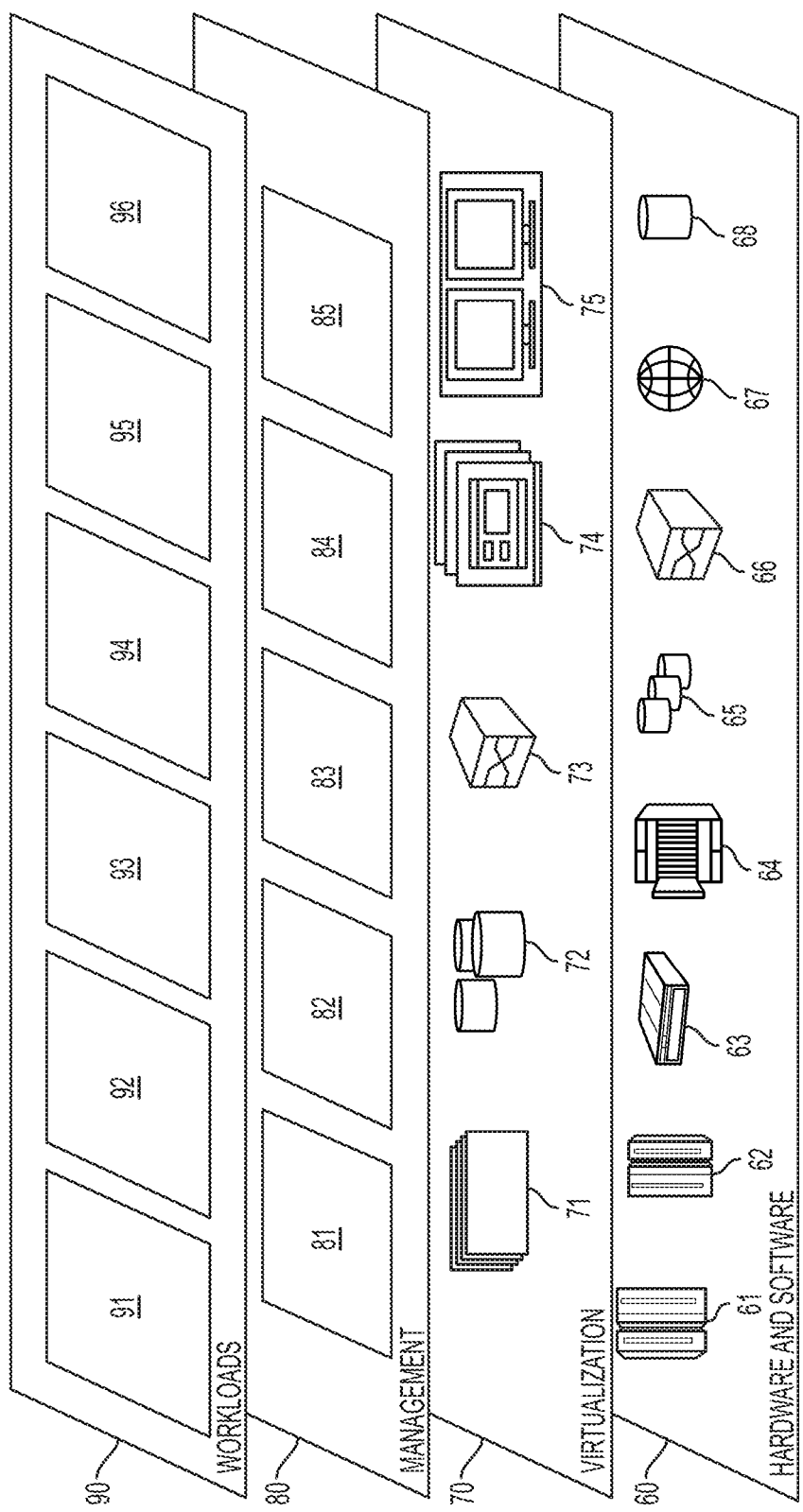
FIG. 8 depicts abstraction model layers according to an embodiment.

FIG. 8 depicts abstraction model layers according to an embodiment. Referring to FIG. 8, a set of functional abstraction layers provided by cloud computing environment 50 (FIG. 7) is shown. It should be understood in advance that the components, layers, and functions shown in FIG. 8 are intended to be illustrative only and embodiments are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and automatically generating names of instances 96.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer implemented method, the method comprising:
provisioning, by a cloud provisioning server, a first instance based on a template, wherein the template belongs to a tenant of a container, and the first instance comprises one of an instantiated software and an instantiated computing service, the provisioning comprising configuring and providing one or both of a software resource and a service to the first instance;
automatically determining a prefix based at least in part on a resource pool that is assigned to the template of the tenant, wherein the determined prefix is included in a name of a second instance that is also provisioned based on the template of the tenant;
generating a name for the first instance, wherein the generated name starts with the determined prefix, the generated name for the first instance indicating, by including the prefix, an association between the first instance and the second instance, the association including that the first instance and the second instance are provisioned based on the same template and that they use the same resource pool; and
correlating, based on the prefix, the first instance with one or more other instances that are provisioned based on the template of the tenant, the one or more other instances comprising the second instance.

2. The computer implemented method of claim 1, wherein the generated name is based on a number of instances that have been provisioned based on the template of the tenant.

3. The computer implemented method of claim 1, wherein the generated name comprises two alphanumeric digits, ranging from 00 to ZZ.

4. The computer implemented method of claim 1, wherein the generating the name for the first instance comprises replacing a wildcard character within the prefix.

5. The computer implemented method of claim 1, wherein the prefix comprises a length of 1 to 6 characters.

6. The computer implemented method of claim 1, wherein the prefix is further based on a prefix that has been assigned to the resource pool.

7. A computer system comprising:
a memory; and
a processor system communicatively coupled to the memory;
the processor system configured to perform a method comprising:

provisioning a first instance based on a template, wherein the template belongs to a tenant of a container, and the first instance comprises one of an instantiated software and an instantiated computing service, the provisioning comprising configuring and providing one or both of a software resource and a service to the first instance;

automatically determining a prefix based at least in part on a resource pool that is assigned to the template of the tenant, wherein the determined prefix is included in a name of a second instance that is also provisioned based on the template of the tenant; and generating a name for the first instance, wherein the generated name starts with the determined prefix, the generated name for the first instance indicating, by including the prefix, an association between the first instance and the second instance, the association including that the first instance and the second instance are provisioned based on the same template and that they use the same resource pool; and correlating, based on the prefix, the first instance with one or more other instances that are provisioned based on the template of the tenant, the one or more other instances comprising the second instance.

8. The computer system of claim 7, wherein the generated name is based on a number of instances that have been provisioned based on the template of the tenant.

9. The computer system of claim 7, wherein the generated name comprises two alphanumeric digits, ranging from 00 to ZZ.

10. The computer system of claim 7, wherein the generating the name for the first instance comprises replacing a wildcard character within the prefix.

11. The computer system of claim 7, wherein the prefix comprises a length of 1 to 6 characters.

12. The computer system of claim 7, wherein the prefix is further based on a prefix that has been assigned to the resource pool.

13. A computer program product comprising:
a computer-readable storage medium having program instructions embodied therewith, wherein the computer-readable storage medium is not a transitory signal per se, the program instructions readable by a processor system to cause the processor system to perform a method comprising:

provisioning, by a cloud provisioning server, a first instance based on a template, wherein the template belongs to a tenant of a container, and the first instance comprises one of an instantiated software and an instantiated computing service, the provisioning comprising configuring and providing one or both of a software resource and a service to the first instance;

automatically determining a prefix based at least in part on a resource pool that is assigned to the template of the tenant, wherein the determined prefix is included in a name of a second instance that is also provisioned based on the template of the tenant;

generating a name for the first instance, wherein the generated name starts with the determined prefix, the generated name for the first instance indicating, by including the prefix, an association between the first instance and the second instance, the association including that the first instance and the second instance are provisioned based on the same template and that they use the same resource pool; and correlating, based on the prefix, the first instance with one or more other instances that are provisioned based on the template of the tenant, the one or more other instances comprising the second instance.

14. The computer program product of claim 13, wherein the generated name is based on a number of instances that have been provisioned based on the template of the tenant.

15. The computer program product of claim 13, wherein the generated name comprises two alphanumeric digits, ranging from 00 to ZZ.

16. The computer program product of claim 13, wherein the generating the name for the first instance comprises replacing a wildcard character within the prefix.

17. The computer program product of claim 13, wherein the prefix comprises a length of 1 to 6 characters.

* * * * *